(12) United States Patent
Norbauer et al.

(10) Patent No.: US 12,165,818 B1
(45) Date of Patent: Dec. 10, 2024

(54) KEYBOARD HAVING A STABILIZER MECHANISM, KEY STABILIZER MECHANISM, AND METHOD

(71) Applicant: Norbauer & Co. LLC., Los Angeles, CA (US)

(72) Inventors: Ryan Norbauer, Los Angeles, CA (US); Bo Noergaard Klerk, Copenhagen (DK)

(73) Assignee: Norbauer & Co. LLC, Los Angeles, CA (US)

( * ) Notice: Subject to any disclaimer, the term of this patent is extended or adjusted under 35 U.S.C. 154(b) by 0 days.

(21) Appl. No.: 18/402,235

(22) Filed: Jan. 2, 2024

(51) Int. Cl.
*H01H 3/12* (2006.01)
*G06F 3/02* (2006.01)
*H01H 13/70* (2006.01)
*H01H 17/04* (2006.01)

(52) U.S. Cl.
CPC .......... *H01H 3/122* (2013.01); *G06F 3/0202* (2013.01); *H01H 13/7013* (2013.01); *H01H 17/04* (2013.01)

(58) Field of Classification Search
CPC .... H01H 3/122; H01H 13/7013; H01H 17/04; H01H 3/125; H01H 13/7065; H01H 3/12; H01H 13/70; G06F 3/0202; G06F 3/02
See application file for complete search history.

(56) References Cited

U.S. PATENT DOCUMENTS

| 11,521,809 | B2 * | 12/2022 | Wu | H01H 3/122 |
| 11,755,125 | B1 * | 9/2023 | Norbauer | G06F 3/0224 |
| | | | | 345/168 |
| 2023/0050678 | A1 * | 2/2023 | Wang | H01H 13/20 |

\* cited by examiner

*Primary Examiner* — Lheiren Mae A Caroc
(74) *Attorney, Agent, or Firm* — Witters & Associates; Steve Witters

(57) ABSTRACT

Presently provided is a keyboard, key stabilizer mechanism, and method. At least one of the keys on the keyboard has a stabilizer mechanism with spaced apart bases. A stem is supported on each of the bases with perpendicularly disposed hinges. A wire is disposed to cooperate with a hinge supporting each of the stems.

22 Claims, 6 Drawing Sheets

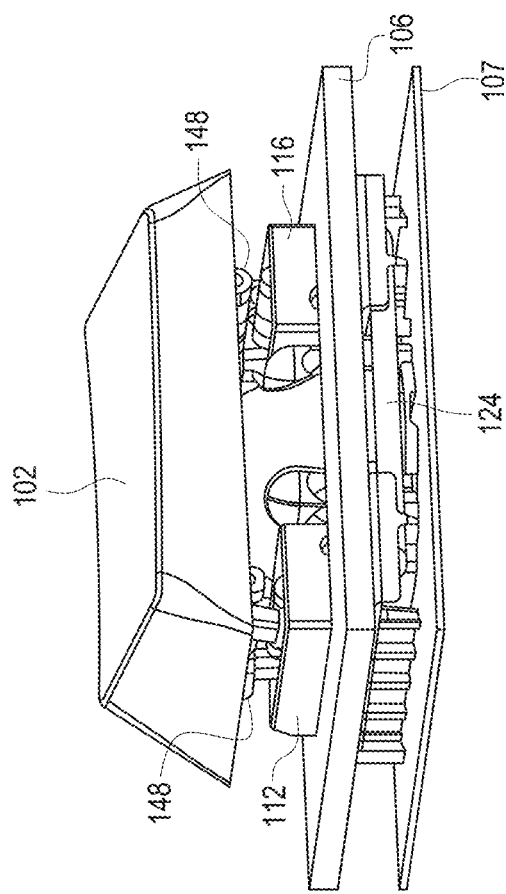
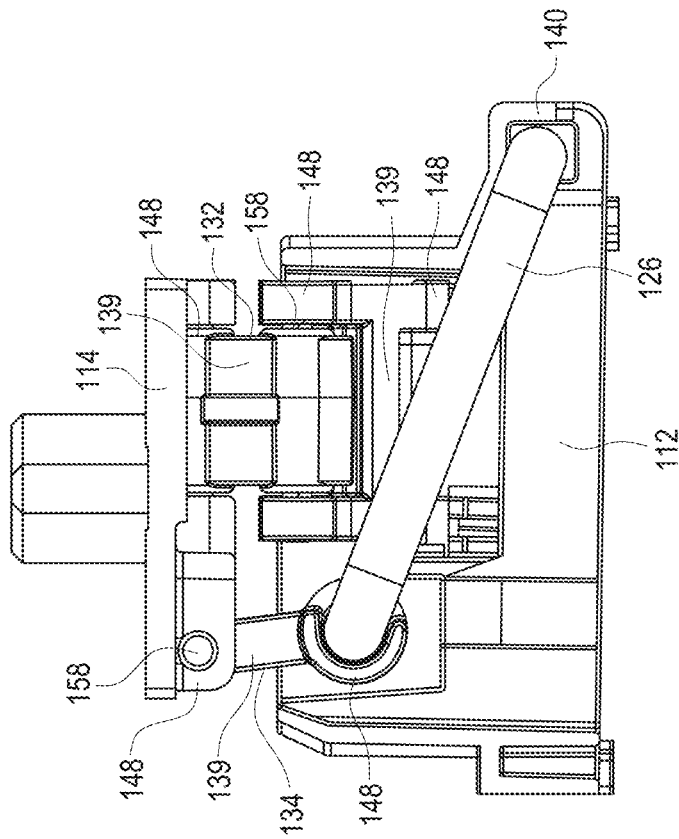

KEYBOARD HAVING A STABILIZER MECHANISM, KEY STABILIZER MECHANISM, AND METHOD

FIELD OF INVENTION

The present invention relates to key stabilizer mechanisms and keyboards.

BACKGROUND OF THE INVENTION

Under the ANSI standard, some computer keyboard keys are longer than others. For example, keys such as the standard backspace key, spacebar, and other widened keys, which may benefit from stabilization. Without some form of stabilizer mechanism, an undesirable seesaw effect may occur when a user presses the far left or the far right of the longer keycaps.

A common keyboard keycap type currently in use is the Cherry™ MX style keycap, which has a stem with a negative cruciform geometry. These keycaps (typically made of ABS or PBT thermoplastics) are then press-fit onto spring-loaded electrical switches of various types, which have a positive version of the negative geometry on the keycap stem as the mounting point.

Smaller keys, such as alphanumeric character keys, may have just a single cruciform stem in their center and the longer keys may have one or two additional cruciform stems, placed to the side(s) of the switch position. These stabilizer stems fit into mating cruciform stems on stabilizer mechanisms (of varying types) on either side of the switch.

In the most common Cherry™ MX design, each stabilizer assembly is typically made of a bent wire and four injection molded parts: two stems and two housings or bases. The bent wire is disposed to link motion between each of the stems, wherein each stem is held within a housing. These mechanisms essentially function as linked linear bearings that move up and down together, pulling both ends of the keycap up and down in tandem to mitigate any seesaw effect.

These common stabilizers may fail to provide an optimal stabilization of the keys or keycaps. For example, the cooperation between the parts may be either loose or prone to binding. Unpleasant sounds, such as rattle or vibration may be exhibited by the currently provided keyboards or key stabilizers. These undesired effects may be due to the sound of hard surfaces, plastic and wire, striking against each other when a keycap is pressed. A typical solution employed is an application of high-viscosity grease to fill the gaps between the hard plastic and wire parts of the stem and housing. The grease may mitigate the wire from rattling directly against the plastic of the stem and the plastic of the stem against the housing. However, the use of high-viscosity lubricant is a suboptimal solution for various reasons. Firstly, since it relies primarily on the bulk effect of the lubrication rather than its lubricating properties to provide the dampening, the effect wears away over time as the lubrication seeps away from the interstices between the mating parts. Regular maintenance or subsequent applications of grease can be onerous, as application of grease may require completely disassembling the keyboard. Additionally, it may be labor-intensive to produce and ship parts lubricated in this manner. For example, quality control of the consistency of assembly and application of the lubricant or grease may be challenging.

SUMMARY

In one aspect of the present disclosure, a keyboard is provided. The keyboard comprises a plurality of keys, each having a keycap, supported with a switch plate or PCB. Each of the keys has a lifting mechanism configured and disposed to bias its keycap from the switch plate or PCB. At least one of the keys hasa stabilizer mechanism configured and disposed to stabilize its keycap. The stabilizer mechanism has a first base held with the switch plate or PCB, a first stem movably supported with the first base, a second base held with the switch plate or PCB at a distance from the first base, and a second stem movably supported with the second base. The keycap is attached to the first stem and the second stem and longitudinally extends the distance between the stems. A wire has a first arm configured and disposed to cooperate with the first stem and a second arm configured and disposed to cooperate with the second stem. At least one wire holder is configured and disposed to rotatingly hold a portion of the wire, between its first arm and its second arm, at a substantially constant distance from the switch plate or PCB. A first hinge has a first leaf with a pivot cooperating with the first stem, a second leaf having a pivot cooperating with the first base, and a pivot disposed between its first leaf and its second leaf. A second hinge has a leaf with a pivot cooperating with the first stem and configured and disposed to pivot about the first arm of the wire. The first hinge is disposed substantially perpendicular to the second hinge. A third hinge has a first leaf with a pivot cooperating with the second stem, a second leaf having a pivot cooperating with the second base, and a pivot disposed between its first leaf and its second leaf. A fourth hinge has a leaf with a pivot cooperating with the second stem and configured and disposed to pivot about the second arm of the wire. The third hinge is disposed substantially perpendicular to the fourth hinge.

In another aspect of the present disclosure, a key stabilizer mechanism is provided. The stabilizer mechanism has a first base held with a switch plate or PCB, a first stem movably supported with the first base, a second base held with the switch plate or PCB at a distance from the first base, and a second stem movably supported with the second base. A keycap is attached to the first stem and the second stem and longitudinally extends the distance between the stems. A wire has a first arm configured and disposed to cooperate with the first stem and a second arm configured and disposed to cooperate with the second stem. At least one wire holder is configured and disposed to rotatingly hold a portion of the wire, between its first arm and its second arm, at a substantially constant distance from the switch plate or PCB. A first hinge has a first leaf with a pivot cooperating with the first stem, a second leaf having a pivot cooperating with the first base, and a pivot disposed between its first leaf and its second leaf. A second hinge has a leaf with a pivot cooperating with the first stem and configured and disposed to pivot about the first arm of the wire. The first hinge is disposed substantially perpendicular to the second hinge. A third hinge has a first leaf with a pivot cooperating with the second stem, a second leaf having a pivot cooperating with the second base, and a pivot disposed between its first leaf and its second leaf. A fourth hinge has a leaf with a pivot cooperating with the second stem and configured and disposed to pivot about the second arm of the wire. The third hinge is disposed substantially perpendicular to the fourth hinge.

In a further aspect of the present disclosure, a method of stabilizing a keycap on a keyboard is provided. The method comprises the steps of holding a first base with a switch plate or a PCB; movably supporting a first stem on the first base with a first hinge and a substantially perpendicular disposed second hinge; holding a second base with the switch plate or PCB at a distance from the first base; movably supporting a second stem on the second base with a third hinge and a substantially perpendicular disposed fourth hinge; attaching a keycap to the first stem and the second stem and longitudinally extending the keycap the distance between the stems; disposing a first arm of a wire to cooperate with the first stem and a second arm to cooperate with the second stem; rotatingly holding a portion of the wire, between its first arm and its second arm, at a substantially constant distance from the switch plate or PCB; pressing the keycap toward the switch plate or PCB and thereby: collapsing the first hinge between the first stem and the first base by pivoting two leaves about three pivots; pivoting a leaf disposed with the second hinge about the first stem and the first arm of the wire; collapsing the third hinge between the second stem and the second base by pivoting two leaves about three pivots; pivoting a leaf disposed with the fourth hinge about the second stem and the second arm of the wire; and rotating the wire.

BRIEF DESCRIPTION OF THE DRAWINGS

The foregoing and other features of this disclosure will become more fully apparent from the following description and appended claims, taken in conjunction with the accompanying drawings and examples. Understanding that these drawings depict only several embodiments in accordance with the disclosure and are therefore, not to be considered limiting of its scope, the disclosure will be described with additional specificity and detail through use of the accompanying drawings.

The following figures, which are idealized, are not to scale and are intended to be merely illustrative of aspects of the present disclosure and non-limiting. In the drawings, like elements may be depicted by like reference numerals. The drawings are briefly described as follows:

FIG. 3 shows the illustrative example shown in FIG. 2 showing the disposition of hinges supporting a stem;

FIG. 4 shows an illustrative example of the stabilizer mechanism of the present disclosure disposed to stabilize a keycap on a keyboard;

DETAILED DESCRIPTION OF THE INVENTION

Figure 1:
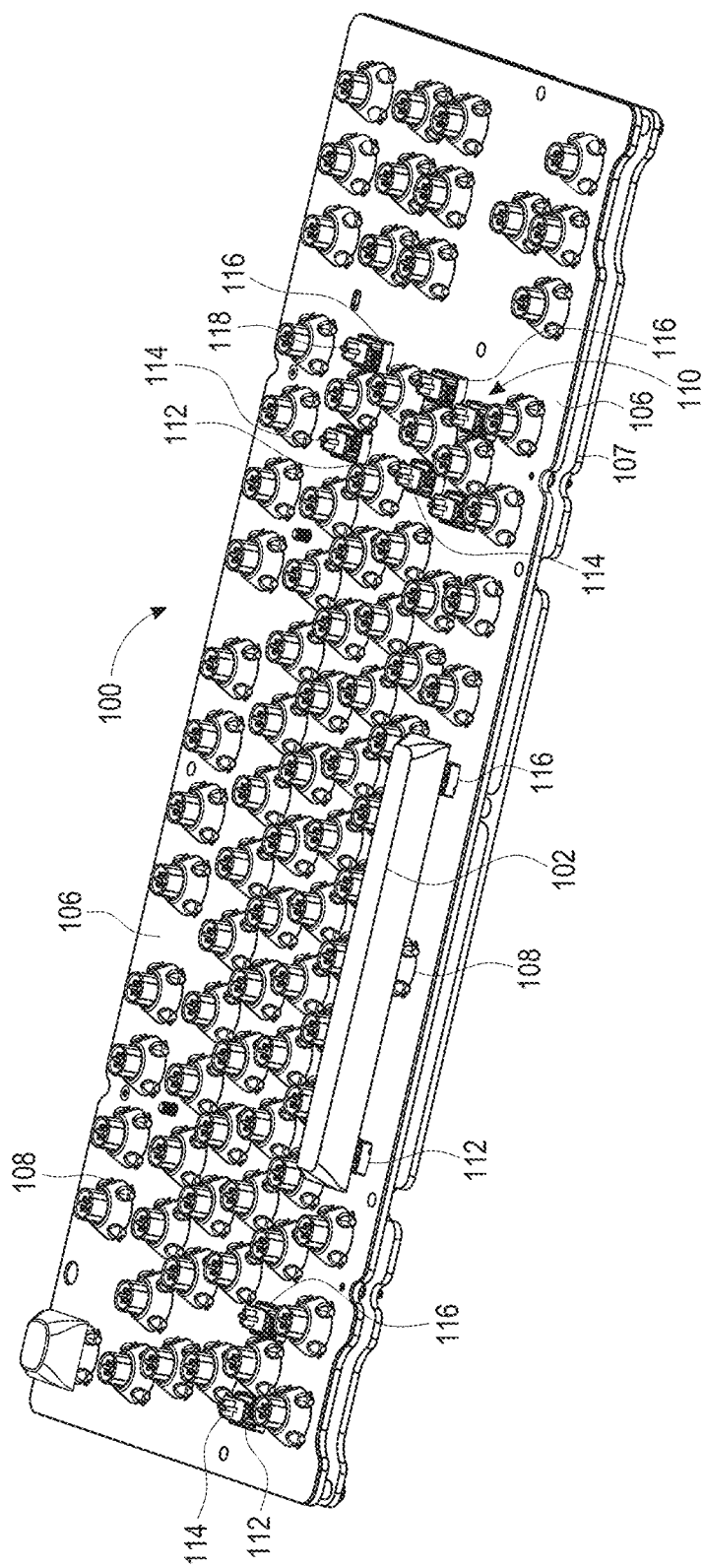
FIG. 1 shows an illustrative example of the presently disclosed keyboard having a stabilizer mechanism of the present disclosure.

The present disclosure provides a keyboard having a stabilizer mechanism, stabilizer mechanism, and method. Aspects of the present disclosure may provide a desired stabilization of keycaps which may provide for desired function upon pressing a keycap. For example, a keyboard having a keycap stabilized with the presently disclosed stabilizing mechanism may provide a reliable, smooth, or quiet operating keyboard over a long period of time with minimal maintenance or manual tuning.

Terms as Used Herein:

The switch is the mechanism that sits beneath each keycap on a keyboard. It is responsible for registering when a key is pressed so that they keyboard can send a corresponding signal to the computer. There are several types of switches available, including mechanical, capacitive, rubber membrane, and scissor switches. Mechanical switches are often preferred by gamers and professionals for their tactile feedback and durability. Switches often include a keycap lifting mechanism.

The switch plate of a keyboard is the flat surface that supports the switches and keycaps. It is typically made of plastic or metal and provides a solid foundation for the keys to rest on or in. The underside of the switch plate may also typically act as a connection point for circuitry that connects the switches to the computer, allowing for the detection and transmission of keystrokes. Some keyboards have a removable switch plate, which can make it easier to clean or replace individual components. Other keyboards may have PCBs that serve a dual function as both PCB and switch plate.

A PCB is a sheet that serves as a connection point for circuitry that connects the switches to the computer, allowing for the detection and transmission of keystroke. The PCB may be disposed below the switch plate and may be a separate component part.

A key stabilizing mechanism on a keyboard is a component that helps to keep a keycap stable and centered over its corresponding switch. This is important, because without a stabilizer certain keys, such as the larger keys like the spacebar or shift keys, may wobble or feel uneven when pressed, making typing less comfortable and accurate.

A hinge has at least one leaf and at least one pivot. The pivots may have a flexure bearing or pin joint.

Binding refers to the undesirable situation where the mating surfaces or geometries of the stabilizer assembly become stuck or bound up against each other, restricting movement and preventing the free up-and-down movement of the overall stabilized switch assembly.

Rattle refers to the sound of the wire striking against a stem or slider, or other parts of a stabilizer assembly.

Ticking is the term given to the sound of plastic stabilizer components striking against each other, such as a stem or slider striking the walls of a hard plastic housing or base.

The presently disclosed keyboard or stabilizer mechanism mitigates or eliminates binding, rattle, or ticking which may be exhibited with current keyboards. For example, current keyboards may exhibit loud or obnoxious noise, bind, or may require maintenance to control these and other undesired properties.

In at least one embodiment of the present disclosure, the presently disclosed stabilizer mechanism provides a keyboard with more quiet and subtle operation with minimal maintenance than currently provided keyboards. The currently disclosed stabilizer mechanism may substantially remove rattle and ticking, without introducing binding.

Current keyboards may have very loose fits between components in their stabilizers since bearing stems need to move very freely up and down within their two housings or bases. Providing these large clearances makes this free movement possible, but at the cost of added rattle due to the hard parts hitting against each other as the mechanism operates. The reason for the need for these large clearances, however, is that current designs are kinematically over-constrained. Frequently with these over-constrained systems, friction from multiple contact surfaces may introduce unnecessary resistance into the overall mechanism, which in turn may lead to binding of the bearing and failure of the movement, which is why the large clearances are typically present.

There may be considerable variability in the distance between the two stabilized (distal) stems on keycaps across various manufacturers. Wide gaps between a stabilizer stem and its housings may allow for the slightly different lengths between stabilizer stems on varying keycaps, thus allowing a stabilizer mechanism to be used with keycaps of slightly different stem spacing without binding. However, this typically comes at the cost of increased propensity of the mechanism to generate unwanted sounds. On the other hand, decreasing those gaps can come at the cost of an increased propensity to bind, especially in over-constrained designs.

One common type of key stabilizer is called a wire stabilizer, also known as a "Costar-style" stabilizer. This mechanism consists of one or more wires that attach to and run across the bottom of a keycap, connecting it to the switch plate of the keyboard. The interface between the parts acts as a guide, keeping the keycap centered and reducing wobbling or side-to-side movement.

Another type of key stabilizer is known as a "Cherry-style" stabilizer. This mechanism uses a pair of plastic housings that attach to the switch plate or PCB of the keyboard, a pair of stems that move up and down inside these housings, and a wire that runs through the two stems and housings. When the key is pressed, the wire rotates in the clip, keeping the keycap stable and preventing its off-axis movement.

Both wire stabilizers and Cherry-style stabilizers can be found on mechanical keyboards and are often interchangeable, depending on the specific model and key layout. Some keyboards may also have additional stabilizers or dampeners, such as rubber O-rings, to further improve the feel and stability of the keys.

Aspects of the present disclosure provide a key stabilizing mechanism having a pair of substantially perpendicular disposed hinges. A wire may extend between two bases, each base may support a pair of the hinges, and the wire may cooperate with the hinges. The hinges and wire are configured and disposed to provide stabilization of a key or keycap, keeping corresponding surfaces of the two stems, such as their upper faces, substantially coplanar and moving substantially in tandem throughout the travel of the mechanism.

FIG. 1 shows keyboard 100 having a plurality of keys, each key having a keycap 102, supported on a switch plate 106 or PCB 107. Keyboard 100 is shown with its housing and many keycaps removed to show its component parts. At least one of the keys has a stabilizer mechanism 110 configured and disposed to stabilize its keycap 102. Each of the keys has a lifting mechanism or switch 108 configured and disposed to bias its keycap 102 from switch plate 106 or PCB 107. Lifting mechanism 108 may be a component part of, or function of, a switch as depicted in FIG. 1. At least one of the keys has a stabilizer mechanism 110 configured and disposed to stabilize its keycap 102. For example, keycaps 102 such as spacebars and/or other elongated keys such as shift, backspace, return, and other keys, may have stabilizer mechanism 110 of the present disclosure.

In at least one embodiment, keyboard 100 has a plurality of keys, each having a keycap 102, supported with a switch plate 106 or PCB 107. Each of the keys having a lifting mechanism or switch 108 configured and disposed to bias its keycap 102 from switch plate 106 or PCB 107.

At least one of the keys has a stabilizer mechanism 110 configured and disposed to stabilize its keycap 102. Stabilizer mechanism 110 has a first base 112 held with switch plate 106 or PCB 107 and a first stem 114 movably supported with the first base. A second base 116 is held with the switch plate 106 or PCB 107 at a distance 120 from first base 112 and movably supports a second stem 118. Keycap 102 is attached to first stem 114 and second stem 118 and longitudinally extends the distance between the stems. A wire 124 has a first arm 126 configured and disposed to cooperate with first stem 114 and a second arm 128 configured and disposed to cooperate with second stem 118.

Wire 124 may be disposed above, below, or penetrating through the switch plate 106. Wire 124 may comprise metal or polymeric materials. The cooperation of wire 124 with first stem 114 and second stem 118 may provide for stabilization of the keycap 102 supported thereon. For example, a pressure applied to one end of keycap 102 may be transferred to both first stem 114 and second stem 118. This may cause both ends of an elongated keycap 102 to simultaneously move toward the switch plate 106 or PCB 107 upon pressing keycap 102 at most any point about the length of the keycap 102.

It is to be understood that aspects of the currently disclosed stabilizer mechanism may have like components or components that may be mirror images of components. A reference to a first component may also reference or describe a second component. For example, a description of a first base or first stem may also serve to describe a second base or second stem as they may be mirror images of one another. Additionally, it is to be understood that the currently described stabilizer mechanism may be installed in different orientations than those described or shown, such as rotated 180 degrees about the central axis of travel of the switch 108.

Figure 2:
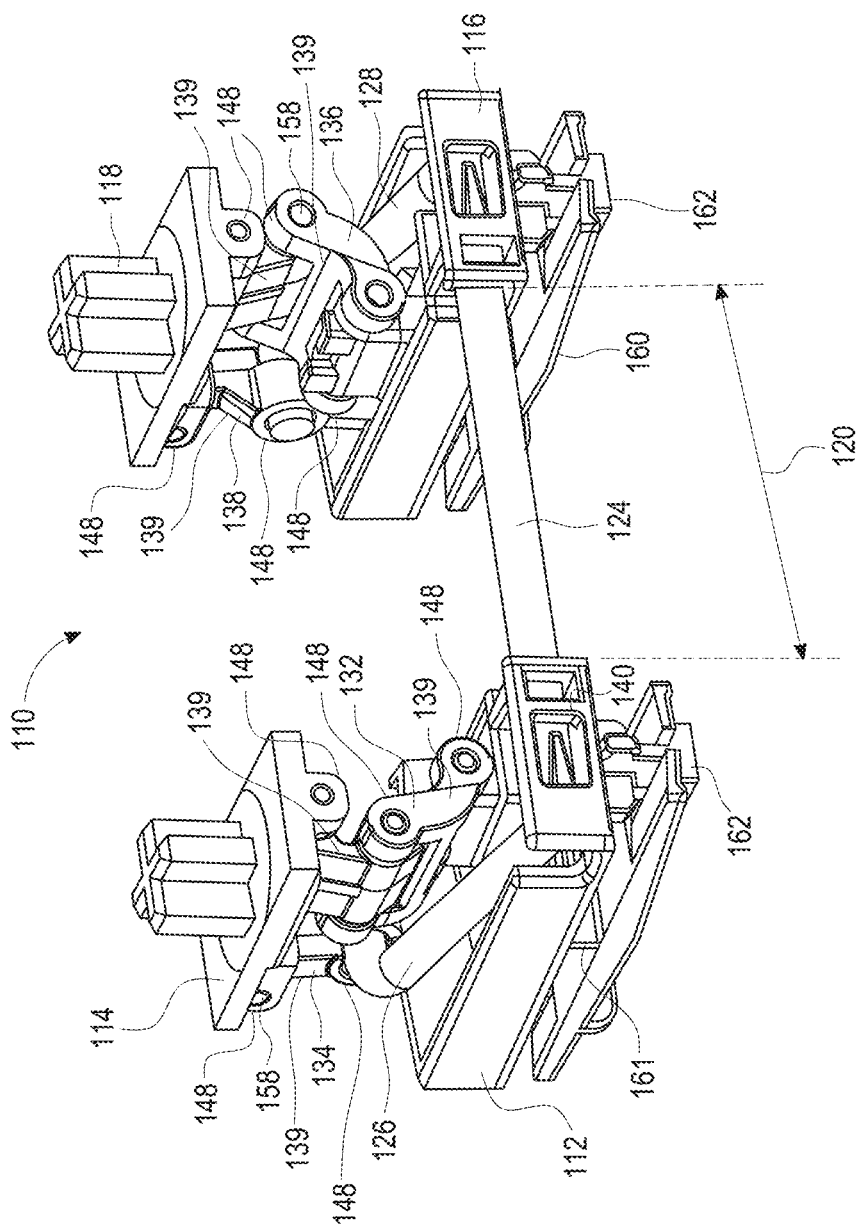
FIG. 2 shows an illustrative example of a stabilizer mechanism of the present disclosure.

FIG. 2 illustratively shows stabilizer mechanism 110 disposed with keyboard 100. FIG. 3 is an illustrative side view of the stabilizer mechanism 110 showing the disposition of hinges 132 and 134 supporting first stem 114 with first base 112 and the disposition of hinges 136 and 138 supporting second stem 114 with second base 116. FIG. 4 shows an illustrative example stabilizer mechanism 110 disposed to stabilize keycap 102 on a keyboard.

Stabilizer mechanism 110 has a first base 112 held with a switch plate or PCB, such as PCB 107 as shown in FIG. 4. First stem 114 is movably supported with first base 112. Second base 116 is held with the switch plate or PCB at a distance 120 from the first base 112. A second stem 118 is movably supported with second base 116. An extension, such as a keycap 102, is attached to first stem 114 and second stem 118 and longitudinally extends the distance 120 between the stems. A wire 124 has a first arm 126 configured and disposed to cooperate with the first stem 114 and a second arm 128 configured and disposed to cooperate with second stem 118.

At least one wire holder 140 is configured and disposed to rotatingly hold a portion of wire 124, between first arm 126 and second arm 128, at a substantially constant distance from switch plate 106 or PCB 107.

Perpendicularly disposed hinges may support the stems on bases. Each of the hinges may have at least one leaf 139 extending between pivots 148. Pivots 148 may be pin joints having pin 158, flexure bearings 159, or configured to pivot about an arm of wire 124. In the illustrated embodiment, a first hinge 132 has a first leaf 139 with a pivot 148 cooperating with first stem 114, a second leaf 139 having a pivot 148 cooperating with first base 112, and a pivot 148 disposed between its first leaf 139 and its second leaf 139. A second hinge 134 has a leaf 139 with a pivot 148 cooperating with first stem 114 and configured and disposed to pivot about first arm 126 of wire 124. First hinge 132 is disposed substantially perpendicular to second hinge 134.

A third hinge 136 has a first leaf 139 with a pivot 148 cooperating with second stem 118, a second leaf 139 having a pivot 148 cooperating with second base 116, and a pivot 148 disposed between its first leaf and its second leaf. A fourth hinge 138 has a leaf 139 with a pivot 148 cooperating with second stem 118 and configured and disposed to pivot about second arm 126 of the wire 124. Third hinge 136 is disposed substantially perpendicular to fourth hinge 138. First base 112, first stem 114, first hinge 132, and second hinge 134 may be mirror images of second base 116, second stem 118, third hinge 136, and fourth hinge 138, respectively.

As shown in FIG. 3, pivot 148 of second hinge 134 may have a pin joint with a pin 158 disposed with first stem 114. In at least one embodiment, pivot 148 of at least one of the second hinge 134 and the fourth hinge 148 has a pin joint with a pin 158 disposed with the stem with which it cooperates, first stem 114 or second stem 118. In at least one other embodiment, at least one of the pivots 148 of first hinge 132 and third hinge 136 has a pin joint. In at least one further embodiment, all of the pivots in the four hinges are pin joints having a pin 158.

Figure 5:
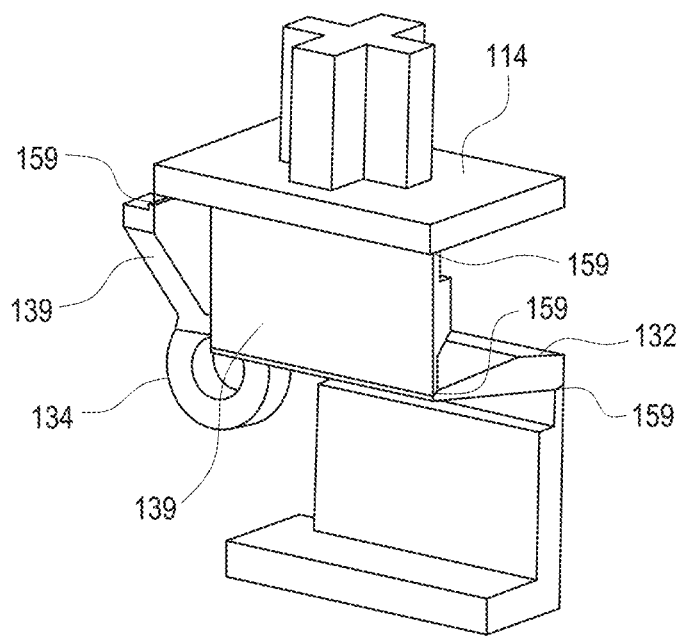
FIG. 5 shows an illustrative example of the stabilizer mechanism of the present disclosure having flexure bearings.

FIG. 5 illustrative shows stabilizer mechanism 110 having flexure bearings 159. Stabilizer mechanism 110 may have one or more flexure bearings 159 or one or more pin joints having a pin 158. For example, at least one of second hinge 134 and fourth hinge 138 may have a flexure bearing 159 extending from the stem with which it cooperates. Flexure bearings 159 may be unitary with the stem, base, or leaf 139 from which they extend. In at least one embodiment, leaf 139, flexure bearing 159, and the stem 114 or 118 are of a unitary structure. In at least one other embodiment, at least one of the pivots of at least one of first hinge 132 and third hinge 136 has a flexure bearing. In at least one further embodiment, all of the pivots in the four hinges have flexure bearings 159.

Figure 6:
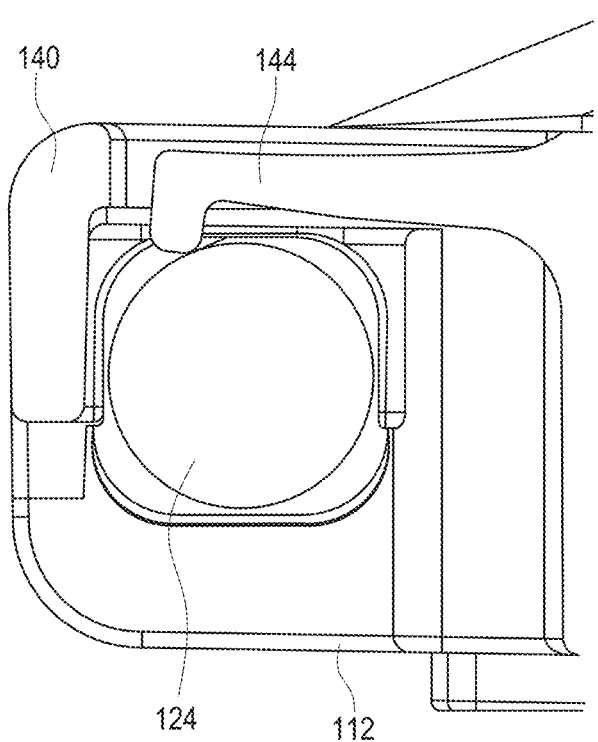
FIG. 6 shows an illustrative example of a stabilizer mechanism of the present disclosure having a flexible arm for biasing the wire against contact surfaces.

FIG. 6 shows an illustrative example of stabilizer mechanism 110 having a flexible arm 144 having a contact surface configured and disposed to bias wire 124 against contact surfaces. A flexible arm 144 may be disposed with one or more of first base 112, second base 116, switch plate 106, and PCB 107. For example, flexible arm 144 may be configured and disposed to bias, or apply pressure on, a rotatable length of wire 124, between first arm 126 and second arm 128, causing it to remain in contact with surfaces of first base 112 and second base 116 throughout a keystroke. In at least one embodiment, each base has a wire holder 140 extending therefrom and flexible arm 144 with a contact surface configured and disposed to bias wire 124 against opposing surfaces of wire holders 140. For example, wire holder 140 or base 112 may have a flexible beam or arm 144 that has some interference with wire 124, which applies a small preload therewith. In at least one embodiment, flexible arm 144 is comprised of a flexible material and disposes a contact surface for biasing a rotatable length of wire 124 against other contact surfaces. For example, a contact surface may be supported, or disposed, with flexible arm 144. In at least one embodiment, flexible arm 144 comprises a polymeric beam and is configured to provide a desired flexibility. In at least one other embodiment, flexible arm 144, first base 112, and wire holder 140 may be an integral polymeric structure which may be formed as a single component. In at least one other embodiment, flexible arm 144 may be a metallic spring that installs into the first base 112 at or near wire holder 140. Wire holder 140 and flexible arm 144 together may function essentially as a preloaded rotary bearing for the rotatable length of wire 124, preventing clearance and thus mitigating wire rattling within the wire holders 140.

Figure 7:
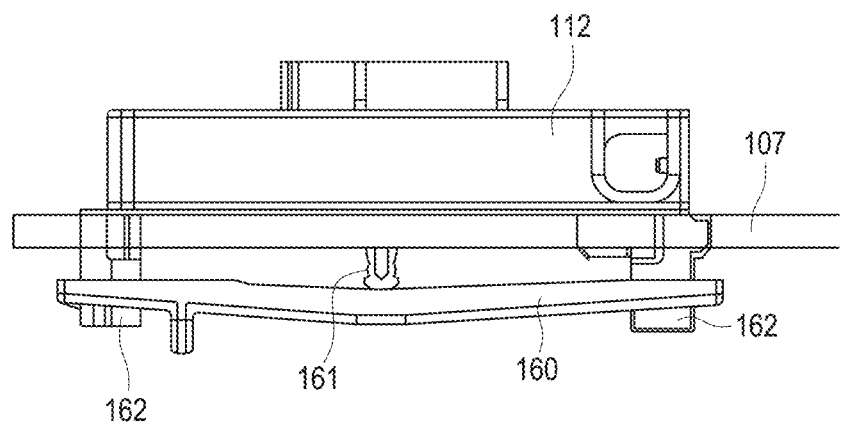
FIG. 7 shows the stabilizer mechanism of the present disclosure having a base and clip configured for holding the base with a keyboard.

FIG. 7 shows the stabilizer mechanism 110 having a first base 112 and clip 160 configured and disposed for holding first base 112 with a keyboard 100. In at least one embodiment, at least one of first base 112 and second base 116 is configured to be held with PCB 107 with clip 160. For example, a switch plate 106 may have an opening for receiving the bases and extensions 162 may be configured and disposed to extend through PCB 107. Clip 160 may be configured to cooperate with extensions 162 and hold one or both of the bases with PCB 107. Spacer 161 may extend from a central portion of clip 160 and cooperate with PCB 107 to provide force on extensions 162, biasing the base on PCB 107. Spacer 161 may have a ribbed configuration for ease in resizing, such as cutting, for different thicknesses of PCB 107 or different desired biasing forces.

Presently disclosed is a method of stabilizing a keycap. The method comprises holding a first base with a switch plate or a PCB and movably supporting a first stem on the first base with a first hinge and a substantially perpendicular disposed second hinge. A second base is held with the switch plate or PCB at a distance from the first base and a second stem is movably supported on the second base with a third hinge and a substantially perpendicular disposed fourth hinge. A keycap is attached to the first stem and the second stem and longitudinally extends the distance between the stems. A first arm of a wire is disposed to cooperate with the first stem and a second arm of the wire is disposed to cooperate with the second stem. A portion of the wire is rotatingly held, between its first arm and its second arm, at a substantially constant distance from the switch plate or PCB. The keycap is pressed toward the switch plate or PCB and thereby: collapses the first hinge between the first stem and the first base by pivoting two leaves about three pivots; pivots a leaf disposed with the second hinge about the first stem and the first arm of the wire; collapses the third hinge between the second stem and the second base by pivoting two leaves about three pivots; pivots a leaf disposed with the fourth hinge about the second stem and the second arm of the wire; and rotates the wire. Upon pressing the keycap proximate a longitudinal end, the rotation of the wire transfers force from one base and stem combination to the other base and stem combination. This transfer of force promotes an even and substantially simultaneous movement of the stems supporting the keycap toward the PCB or switch plate.

One feature or aspect of an embodiment is believed at the time of the filing of this patent application to possibly reside broadly in a keyboard comprising: a plurality of keys, each having a keycap, supported with a switch plate or PCB; each of the keys having a lifting mechanism configured and disposed to bias its keycap from the switch plate or PCB; at least one of the keys having a stabilizer mechanism configured and disposed to stabilize its keycap, the stabilizer mechanism comprising: a first base held with the switch plate or PCB; a first stem movably supported with the first base; a second base held with the switch plate or PCB at a distance from the first base; a second stem movably supported with the second base; the keycap is attached to the first stem and the second stem and longitudinally extends the distance between the stems; a wire having a first arm configured and disposed to cooperate with the first stem and a second arm configured and disposed to cooperate with the second stem; at least one wire holder configured and disposed to rotatingly hold a portion of the wire, between its first arm and its second arm, at a substantially constant distance from the switch plate or PCB; a first hinge having a first leaf with a pivot cooperating with the first stem, a second leaf having a pivot cooperating with the first base, and a pivot disposed between its first leaf and its second leaf, a second hinge having a leaf with a pivot cooperating with the first stem and configured and disposed to pivot about the first arm of the wire; wherein the first hinge is disposed substantially perpendicular to the second hinge; a third hinge having a first leaf with a pivot cooperating with the second stem, a second leaf having a pivot cooperating with the second base, and a pivot disposed between its first leaf and its second leaf, a fourth hinge having a leaf with a pivot cooperating with the second stem and configured and disposed to pivot about the second arm of the wire; and wherein the third hinge is disposed substantially perpendicular to the fourth hinge.

Another feature or aspect of an embodiment is believed at the time of the filing of this patent application to possibly reside broadly in the keyboard, wherein the pivot of at least one of the second hinge and the fourth hinge has a flexure bearing extending from the stem with which it cooperates.

Yet another feature or aspect of an embodiment is believed at the time of the filing of this patent application to possibly reside broadly in the keyboard, wherein the pivot of at least one of the second hinge and the fourth hinge has a pin joint with a pin disposed with the stem with which it cooperates.

Still another feature or aspect of an embodiment is believed at the time of the filing of this patent application to possibly reside in the keyboard, wherein at least one of the pivots of at least one of the first hinge and the third hinge has a flexure bearing.

A further feature or aspect of an embodiment is believed at the time of the filing of this patent application to possibly reside broadly in the keyboard, wherein at least one of the pivots of the first hinge and the third hinge has a pin joint.

Another feature or aspect of an embodiment is believed at the time of the filing of this patent application to possibly reside broadly in the keyboard, wherein all the pivots are pin joints.

Yet another feature or aspect of an embodiment is believed at the time of the filing of this patent application to possibly reside broadly in the keyboard, wherein all the pivots are flexure bearings.

Still another feature or aspect of an embodiment is believed at the time of the filing of this patent application to possibly reside broadly in the keyboard having at least one contact surface disposed with a flexible arm, the contact surface is configured and disposed to bias a rotatable length of the wire between the arms against other contact surfaces and to maintain contact with the rotatable length throughout a depression of the keycap.

A further feature or aspect of an embodiment is believed at the time of the filing of this patent application to possibly reside broadly in the keyboard, wherein the first and the second bases are disposed with the PCB, the bases have extensions configured and disposed to extend through the PCB and cooperate with a clip.

Another feature or aspect of an embodiment is believed at the time of the filing of this patent application to possibly reside broadly in a key stabilizer mechanism comprising: a first base held with a switch plate or PCB; a first stem movably supported with the first base; a second base held with the switch plate or PCB at a distance from the first base; a second stem movably supported with the second base; an extension attached to the first stem and the second stem and longitudinally extending the distance between the stems; a wire having a first arm configured and disposed to cooperate with the first stem and a second arm configured and disposed to cooperate with the second stem; at least one wire holder configured and disposed to rotatingly hold a portion of the wire, between its first arm and its second arm, at a substantially constant distance from the switch plate or PCB; a first hinge having a first leaf with a pivot cooperating with the first stem, a second leaf having a pivot cooperating with the first base, and a pivot disposed between its first leaf and its second leaf, a second hinge having a leaf with a pivot cooperating with the first stem and configured and disposed to pivot about the first arm of the wire; wherein the first hinge is disposed substantially perpendicular to the second hinge; a third hinge having a first leaf with a pivot cooperating with the second stem, a second leaf having a pivot cooperating with the second base, and a pivot disposed between its first leaf and its second leaf, a fourth hinge having a leaf with a pivot cooperating with the second stem and configured and disposed to pivot about the second arm of the wire; and wherein the third hinge is disposed substantially perpendicular to the fourth hinge.

Yet another feature or aspect of an embodiment is believed at the time of the filing of this patent application to possibly reside broadly in the key stabilizer mechanism, wherein the pivot of at least one of the second hinge and the fourth hinge has a flexure bearing extending from the stem with which it cooperates.

One feature or aspect of an embodiment is believed at the time of the filing of this patent application to possibly reside broadly in the key stabilizer mechanism, wherein the pivot of at least one of the second hinge and the fourth hinge has a pin joint with a pin disposed with the stem with which it cooperates.

Another feature or aspect of an embodiment is believed at the time of the filing of this patent application to possibly reside broadly in the key stabilizer mechanism, wherein at least one of the pivots of at least one of the first hinge and the third hinge has a flexure bearing.

Yet another feature or aspect of an embodiment is believed at the time of the filing of this patent application to possibly reside broadly in the key stabilizer mechanism, wherein at least one of the pivots of the first hinge and the third hinge has a pin joint.

Still another feature or aspect of an embodiment is believed at the time of the filing of this patent application to possibly reside broadly in the stabilizer mechanism, wherein all the pivots are pin joints.

A further feature or aspect of an embodiment is believed at the time of the filing of this patent application to possibly reside broadly in the key stabilizer mechanism, wherein all the pivots are flexure bearings.

Another feature or aspect of an embodiment is believed at the time of the filing of this patent application to possibly reside broadly in the key stabilizer mechanism having at least one contact surface disposed with a flexible arm, the contact surface is configured and disposed to bias the rotatable length of the wire between the arms against other contact surfaces and to maintain contact with the rotatable length throughout a depression of the keycap.

Yet another feature or aspect of an embodiment is believed at the time of the filing of this patent application to possibly reside broadly in a method of stabilizing a keycap on a keyboard comprising the steps of holding a first base with a switch plate or a PCB; movably supporting a first stem on the first base with a first hinge and a substantially perpendicular disposed second hinge; holding a second base with the switch plate or PCB at a distance from the first base; movably supporting a second stem on the second base with a third hinge and a substantially perpendicular disposed fourth hinge; attaching a keycap to the first stem and the second stem and longitudinally extending the keycap the distance between the stems; disposing a first arm of a wire to cooperate with the first stem and a second arm of the wire to cooperate with the second stem; rotatingly holding a portion of the wire, between its first arm and its second arm, at a substantially constant distance from the switch plate or PCB; pressing the keycap toward the switch plate or PCB and thereby: collapsing the first hinge between the first stem and the first base by pivoting two leaves about three pivots; pivoting a leaf disposed with the second hinge about the first base and the first arm of the wire; collapsing the third hinge between the second stem and the second base by pivoting two leaves about three pivots; pivoting a leaf disposed with the fourth hinge about the second base and the second arm of the wire; and rotating the wire.

Still another feature or aspect of an embodiment is believed at the time of the filing of this patent application to possibly reside broadly in the method, wherein the step of rotatingly holding a portion of the wire comprises biasing the wire against contact surfaces with a flexible arm.

Yet another feature or aspect of an embodiment is believed at the time of the filing of this patent application to possibly reside broadly in the method, wherein the pivoting of the second hinge about the first base comprises flexing a flexure joint.

One feature or aspect of an embodiment is believed at the time of the filing of this patent application to possibly reside broadly in the method, wherein the collapsing of the first hinge between the first stem and the first base comprises flexing a flexure joint extending from the first stem.

Another feature or aspect of an embodiment is believed at the time of the filing of this patent application to possibly reside broadly in the method, wherein at least one of the pivoting of the second hinge about the first base or the collapsing of the first hinge between the first stem and the first base comprises rotating a leaf about a pin.

NOMENCLATURE

- 100 keyboard
- 102 keycap
- 106 switch plate
- 107 PCB
- 108 switch/lifting mechanism
- 110 stabilizer mechanism
- 112 first base
- 114 first stem
- 116 second base
- 118 second stem
- 120 distance between first base and second base
- 124 wire
- 126 first arm of wire
- 128 second arm of wire
- 132 first hinge
- 134 second hinge
- 136 third hinge
- 138 fourth hinge
- 139 leaf
- 140 wire holder
- 144 flexible arm
- 148 pivot
- 158 pin
- 159 flexure bearing
- 160 clip
- 161 spacer
- 162 extension It will be understood that the examples of patents, published patent applications, and other documents which are included below in this application and which are referred to in paragraphs which state "Some examples of . . . which may possibly be used in at least one possible embodiment of the present application . . ." may possibly not be used or useable in any one or more embodiments of the application. These references, or portions thereof, are hereby incorporated by reference herein. The purpose of incorporating U.S. patents, foreign patents, publications, etc. is solely to provide additional information relating to technical features of one or more embodiments, which information may not be completely disclosed in the wording in the pages of this application. Words relating to the opinions and judgments of the author and not directly relating to the technical details of the description of the embodiments therein are not incorporated by reference. The words all, always, absolutely, consistently, preferably, guarantee, particularly, constantly, ensure, necessarily, immediately, endlessly, avoid, exactly, continually, expediently, need, must, only, perpetual, precise, perfect, require, requisite, simultaneous, total, unavoidable, and unnecessary, or words substantially equivalent to the above-mentioned words in this sentence, when not used to describe technical features of one or more embodiments, are not considered to be incorporated by reference herein.

Some examples of features which may possibly be utilizable by at least one possible embodiment may possibly be found in the following which are incorporated by reference herein:

U.S. Ser. No. 11/755,125 titled "STABILIZER MECHANISM FOR A KEYBOARD AND A KEYBOARD HAVING THE STABILIZER MECHANISM", by Norbauer et al., issued 2023 Sep. 12; US20030209417 titled "KEY SWITCH STABILIZER MECHANISM", by Yoneyama, Masayuki, filed 2003 Mar. 13; US20180197699 titled "KEY STABILIZER", by Shen, Hai-nan, filed 2017 Jul. 18; U.S. Pat. No. 3,720,801 titled "SPACE KEY", by Yanaga M, filed 1972 Feb. 3; U.S. Pat. No. 4,384,796 titled "KEYBOARD SPACE BAR STABILIZER", by Denley, Ronald S., filed 1982 Mar. 18; U.S. Pat. No. 4,468,145 titled "KEYBOARD SPACE BAR STABILIZER", by Denley, Ronald S., filed 1983 May 11; and U.S. Pat. No. 4,584,444 titled "KEYBOARD SWITCH", by Nagashima, Takao, filed 1984 Sep. 21.

The invention claimed is:

1. A keyboard comprising:
a plurality of keys, each having a keycap, supported with a switch plate or PCB;
each of the keys having a lifting mechanism configured and disposed to bias its a keycap from the switch plate or PCB;
at least one of the keys having a stabilizer mechanism configured and disposed to stabilize the keycap, the stabilizer mechanism comprising:
a first base held with the switch plate or PCB;
a first stem movably supported with the first base;
a second base held with the switch plate or PCB at a distance from the first base;
a second stem movably supported with the second base;

the keycap is attached to the first stem and the second stem and longitudinally extends the distance between the stems;
a wire having a first arm configured and disposed to cooperate with the first stem and a second arm configured and disposed to cooperate with the second stem;
at least one wire holder configured and disposed to rotatingly hold a portion of the wire, between the first arm and the second arm, at a substantially constant distance from the switch plate or PCB;
a first hinge having a first leaf with a pivot cooperating with the first stem, a second leaf having a pivot cooperating with the first base, and a pivot disposed between the first leaf and the second leaf;
a second hinge having a leaf with a pivot cooperating with the first stem and configured and disposed to pivot about the first arm of the wire;
wherein the first hinge is disposed substantially perpendicular to the second hinge;
a third hinge having a first leaf with a pivot cooperating with the second stem, a second leaf having a pivot cooperating with the second base, and a pivot disposed between the first leaf and the second leaf;
a fourth hinge having a leaf with a pivot cooperating with the second stem and configured and disposed to pivot about the second arm of the wire; and
wherein the third hinge is disposed substantially perpendicular to the fourth hinge.

2. The keyboard of claim 1, wherein the pivot of at least one of the second hinge and the fourth hinge has a flexure bearing extending from the stem with which it cooperates.

3. The keyboard of claim 1, wherein the pivot of at least one of the second hinge and the fourth hinge has a pin joint with a pin disposed with the stem with which it cooperates.

4. The keyboard of claim 1, wherein at least one of the pivots of at least one of the first hinge and the third hinge has a flexure bearing.

5. The keyboard of claim 1, wherein at least one of the pivots of the first hinge and the third hinge has a pin joint.

6. The keyboard of claim 1, wherein all the pivots are pin joints.

7. The keyboard of claim 1, wherein all the pivots are flexure bearings.

8. The keyboard of claim 1 having at least one contact surface disposed with a flexible arm, the contact surface is configured and disposed to bias a rotatable length of the wire between the first arm and the second arm against other contact surfaces and to maintain contact with the rotatable length throughout a depression of the keycap.

9. The keyboard of claim 1, wherein the first and the second bases are disposed with the PCB, the bases have extensions configured and disposed to extend through the PCB and cooperate with a clip.

10. A keycap stabilizer mechanism comprising:
a first base configured to be held with a switch plate or PCB;
a first stem movably supported with the first base;
a second base configured to be held with the switch plate or PCB at a distance from the first base;
a second stem movably supported with the second base;
a keycap configured to be attached to the first stem and the second stem and to longitudinally extend the distance between the stems;
a wire having a first arm configured and disposed to cooperate with the first stem and a second arm configured and disposed to cooperate with the second stem;
at least one wire holder configured and disposed to rotatingly hold a rotatable length of the wire, between the first arm and the second arm, at a substantially constant distance from the switch plate or PCB;
a first hinge having a first leaf with a pivot cooperating with the first stem, a second leaf having a pivot cooperating with the first base, and a pivot disposed between the first leaf and the its second leaf;
a second hinge having a leaf with a pivot cooperating with the first stem and configured and disposed to pivot about the first arm of the wire;
wherein the first hinge is disposed substantially perpendicular to the second hinge;
a third hinge having a first leaf with a pivot cooperating with the second stem, a second leaf having a pivot cooperating with the second base, and a pivot disposed between the first leaf and the second leaf;
a fourth hinge having a leaf with a pivot cooperating with the second stem and configured and disposed to pivot about the second arm of the wire; and
wherein the third hinge is disposed substantially perpendicular to the fourth hinge.

11. The keycap stabilizer mechanism of claim 10, wherein the pivot of at least one of the second hinge and the fourth hinge has a flexure bearing extending from the stem with which it cooperates.

12. The keycap stabilizer mechanism of claim 11, wherein the pivot of at least one of the second hinge and the fourth hinge has a pin joint with a pin disposed with the stem with which it cooperates.

13. The keycap stabilizer mechanism of claim 10, wherein at least one of the pivots of at least one of the first hinge and the third hinge has a flexure bearing.

14. The keycap stabilizer mechanism of claim 10, wherein at least one of the pivots of the first hinge and the third hinge has a pin joint.

15. The keycap stabilizer mechanism of claim 10, wherein all the pivots are pin joints.

16. The keycap stabilizer mechanism of claim 10, wherein all the pivots are flexure bearings.

17. The keycap stabilizer mechanism of claim 10 having at least one contact surface disposed with a flexible arm, the contact surface is configured and disposed to bias the rotatable length of the wire against other contact surfaces and to maintain contact with the rotatable length throughout a depression of the keycap.

18. A method of stabilizing a keycap on a keyboard comprising the steps of:
holding a first base with a switch plate or a PCB;
movably supporting a first stem on the first base with a first hinge and a substantially perpendicular disposed second hinge;
holding a second base with the switch plate or PCB at a distance from the first base;
movably supporting a second stem on the second base with a third hinge and a substantially perpendicular disposed fourth hinge;
attaching a keycap to the first stem and the second stem and longitudinally extending the keycap the distance between the stems;
disposing a first arm of a wire to cooperate with the first stem and a second arm of the wire to cooperate with the second stem;
rotatingly holding a portion of the wire, between the first arm and the second arm, at a substantially constant distance from the switch plate or PCB;

pressing the keycap toward the switch plate or PCB and thereby:
- collapsing the first hinge between the first stem and the first base by pivoting two leaves about three pivots;
- pivoting a leaf disposed with the second hinge about the first stem and the first arm of the wire;
- collapsing the third hinge between the second stem and the second base by pivoting two leaves about three pivots;
- pivoting a leaf disposed with the fourth hinge about the second stem and the second arm of the wire; and
- rotating the wire.

19. The method of claim 18, wherein the rotatingly holding a portion of the wire comprises biasing the wire against contact surfaces with a flexible arm.

20. The method of claim 18, wherein the pivoting of the second hinge about the first stem comprises flexing a flexure joint.

21. The method of claim 18, wherein the collapsing the first hinge between the first stem and the first base comprises flexing a flexure joint extending from the first stem.

22. The method of claim 18, wherein at least one of the pivoting of the second hinge about the first stem and the collapsing the first hinge between the first stem and the first base comprises rotating a leaf about a pin.

* * * * *